Aug. 28, 1951  J. G. FARKAS  2,565,805
JACK STRUCTURE

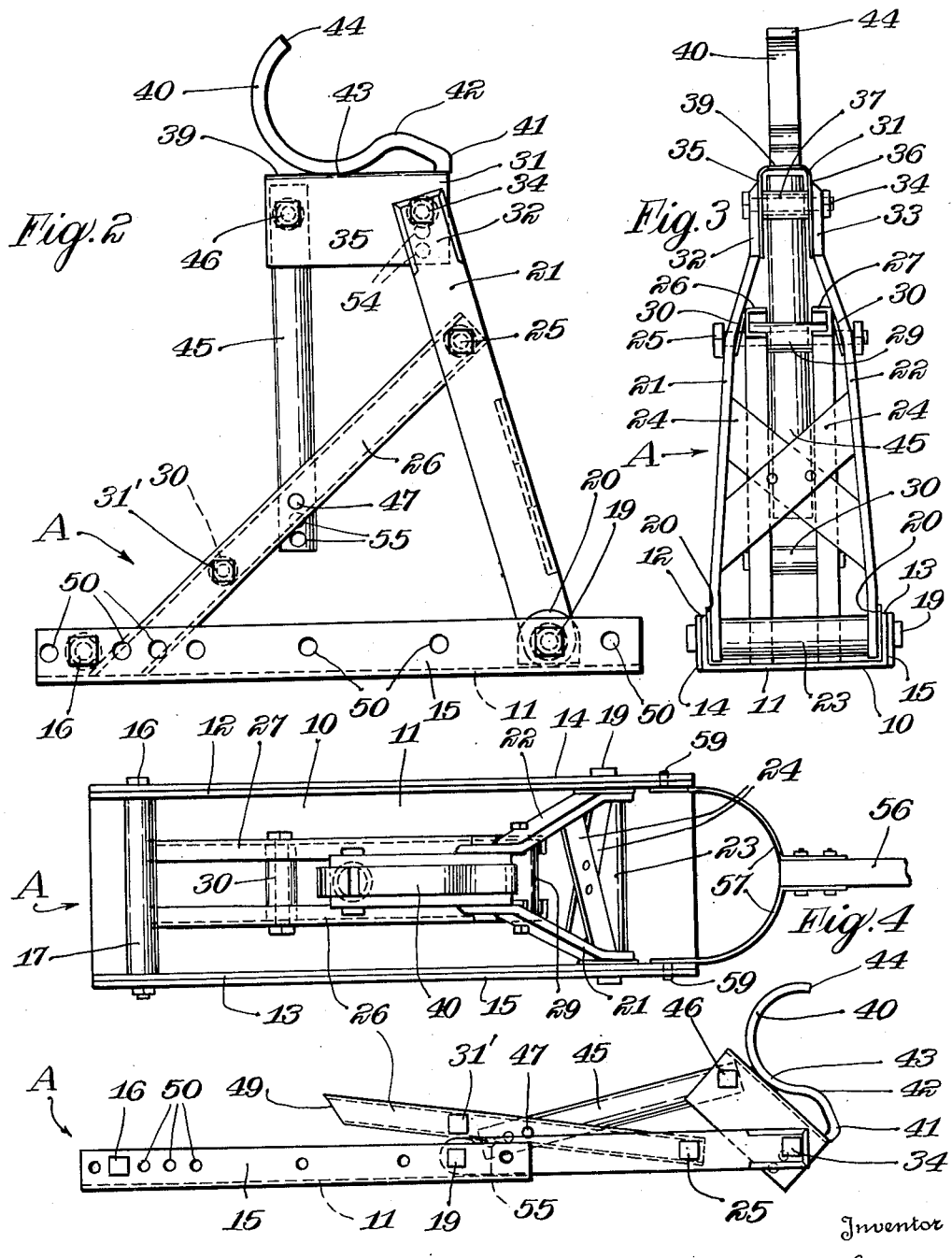

Filed March 25, 1946 2 Sheets-Sheet 2

Inventor
John G. Farkas
By Robert M. Dunning
Attorney

Patented Aug. 28, 1951

2,565,805

UNITED STATES PATENT OFFICE 2,565,805

JACK STRUCTURE

John G. Farkas, St. Paul, Minn.

Application March 25, 1946, Serial No. 656,998

9 Claims. (Cl. 254—94)

My invention relates to an improvement in jack wherein it is desired to provide a means of raising one wheel on one axle of a vehicle by movement of the vehicle.

The task of jacking up one wheel of an automobile has always been a somewhat difficult one. In recent years most cars have been built with a lower center of gravity and with fenders and body parts which more completely enclose the wheels. As a result there has been a trend toward the use of bumper jacks which require the lifting of the body frame sufficiently to raise one wheel off the ground. Because of the distance the body frame must be raised to transmit the necessary lifting movement to the wheels, such jacks are somewhat dangerous to use and require considerable time to operate.

It is the object of the present invention to provide a jack constructed to provide a collapsible platform supported upon a base. This platform is designed to engage beneath an axle or wheel support in lowered position of the wheel. Movement of the vehicle toward the jack acts to lift the axle or wheel support upwardly above the base of the jack, thus raising the tire of the associated wheel from the surface of the ground.

A feature of the present invention resides in the provision of a base which is relatively large in size and which therefore provides a firm and stable support. Because of the relatively small area of the usual jack base, such jacks have a tendency to sink into soft or moist earth. My jack is provided with a base of sufficient area to remain on or near the surface of the earth and will not readily sink thereinto.

A further feature of the present invention resides in mounting upon the base a pair of opposed links which are pivotal relative to the base. These links support a pivotal platform or bracket engageable with the vehicle axle or wheel support. Brace means is provided for the platform and the links to limit pivotal movement thereof. Accordingly when the jack pivots past vertical position, further pivotal movement of the links is arrested, thereby holding the axle or wheel support in an elevated position.

A feature of the present invention resides in the provision of a jack which may be readily lowered when desired. In order to remove the axle or wheel support from the jack it is only necessary to move the vehicle longitudinally in a direction reverse from that used to mount the vehicle upon the jack. Longitudinal movement of the vehicle in this direction will act to swing the links supporting the platform past vertical position and into the collapsed position of the jack.

A further feature of the present invention resides in the provision of a jack which may be used in conjunction with any wheel of the vehicle. When used to elevate one of the rear wheels of the vehicle, the jack is placed in the path of movement of the rear axle or a rear wheel support. A ramp or inclined platform is also placed in the path of the wheel to be elevated. As the rear wheel travels up this inclined platform or ramp the jack swings from collapsed position to elevated position until the supporting links pass vertical position. Further swinging movement of the platform supporting links is then arrested and further movement of the vehicle either slides the base of the jack along the surface of the ground or disengages the ramp from beneath the wheel. The rear wheel may be removed from the jack either by reversing the foregoing procedure or by pushing the car forwardly to collapse the jack. The purpose of the ramp or inclined platform is to provide traction for the wheel being elevated.

These and other objects and novel features of my invention will be more clearly and fully set forth in the following specification and claims.

In the drawings forming a part of my specification:

Figure 1 is a side elevational view of my jack in collapsed position.

Figure 2 is a side elevational view of my jack in elevated position.

Figure 3 is a front elevational view of my jack in elevated position.

Figure 4 is a top plan view of my jack in elevated position.

Figure 5:
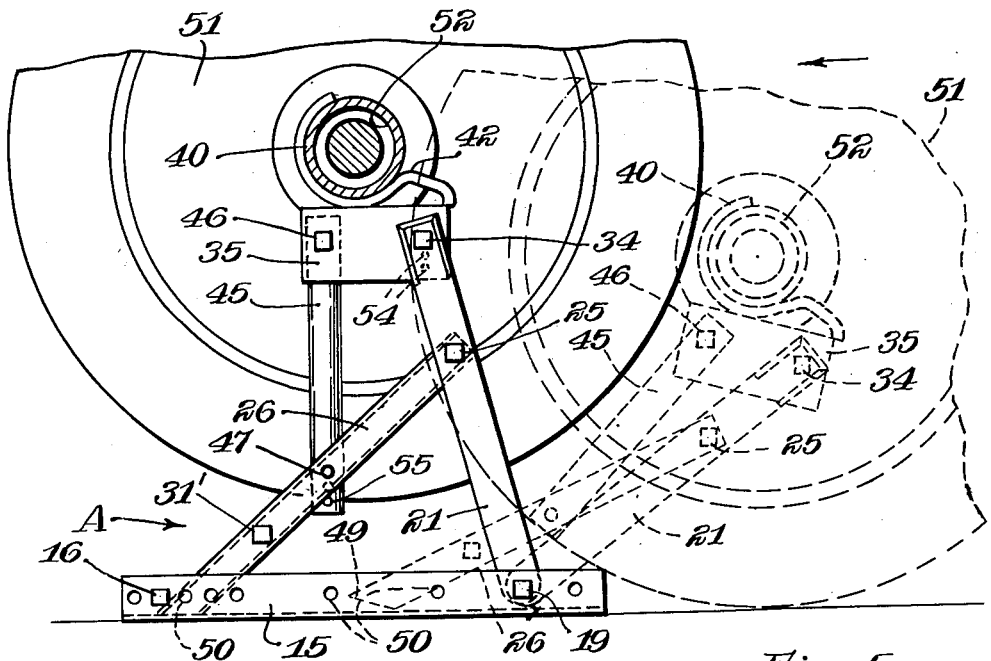
Figure 5 is a side elevational view of my jack during the wheel elevating operation.

The jack A comprises a base 10 of channel shaped formation including a base plate 11 and upright parallel side plates 12 and 13. These side plates 12 and 13 may if desired have reinforcing strips 14 and 15 overlying the same to act as a reinforcement. However, if the channel 10 is of sufficient thickness the additional reinforcing plates are of course unnecessary.

Near one end of the base I provide a bolt 16 which extends through the side plates 12 and 13 and the associated reinforcing plates 14 and 15. A sleeve 17 is mounted upon the bolt 16. This sleeve 17 acts as a spacer between the side walls 12 and 13 and also serves a second purpose which will be later described in detail.

A second bolt 19 extends through the side walls 12 and 13 and the associated reinforcing plates 14 and 15 near the opposite end of the base 10. Washers 20 are positioned to encircle the bolt 19 adjacent each side wall 12 and 13. Links 21 and 22 are pivotally supported by the bolt 19 adjacent the washers 20. A spacing shelf 23 is provided between the pivoted ends of the links 21 and 22 to hold these lower ends in proper spaced relationship.

The links 21 and 22 extend parallel for a short distance from the pivoted ends thereof and then incline slightly toward one another. Cross braces 24 connect the links 21 and 22 to hold the same in proper spaced relationship. A pivot bolt 25 extends through the links 21 and 22 at a point substantially spaced from the pivotal attachment of these links with the base.

A pair of channel braces 26 and 27 are arranged with their open sides in opposed relationship. These channel braces 26 and 27 are held in proper spaced relationship by a pair of spacing sleeves 29 and 30. A bolt 31' extends through the channels 26 and 27 and through the spacing sleeve 30 to hold this spacing sleeve in position and to prevent the channel braces from spreading apart. The pivot bolt 25 extends through the spacing sleeve 29 to pivotally connect the braces 26 and 27 to the links 21 and 22. Washers 30 are preferably provided between the links 21 and 22 and the braces 26 and 27 to permit relative pivotal movement between these parts.

An inverted channel shaped platform 31 is pivotally secured to the upper extremity of the links 21 and 22. These links converge together above the pivot bolt 25, terminating in parallel ends 32 and 33, respectively. A pivot bolt 34 extends through the parallel link ends 32 and 33, through the opposed sides 35 and 36 of the channel shaped platform 31 and also extend through a spacing sleeve 37 between the channel sides. The channel shaped platform is inverted in its position with the base 39 of the channel uppermost and the side walls 35 and 36 depending downwardly therefrom.

A hook shaped bracket 40 is supported upon the base 39 of the platform 31. This bracket 40 terminates with one end 41 in contact with the channel base 39 and with an adjacent portion inclining upwardly therefrom to a hump or peak 42. From the hump or peak 42 the hook bracket 40 curves downwardly to contact at 43 the upper surface 39 of the platform 31, the curve continuing to form a hook with its free end 44 spaced substantially above the level of the platform 31.

A tubular brace 45 is pivoted by a bolt 46 between the sides 35 and 36 of the platform 31. The other end of the brace 45 is pivotally connected by a bolt or rivet 47 to the braces 26 and 27. The brace 45 is so proportioned as to hold the platform 31 in a substantially horizontal position in elevated position of the jack.

As indicated in Figures 1 and 2 of the drawings the lower ends of the channel braces 26 and 27 are tapered at 49 to fit solidly against the base plate 11 when the jack is in upright position. The sleeve 17 acts as a stop for the braces 26 and 27 and when the braces are in engagement with the sleeve 17 the links 21 and 22 are held at a slight angle from vertical position. When in this position the axle or wheel support engaged in the bracket 40 is firmly held in an elevated position by the combination of links and braces. The height of the bracket 40 in upright position may be adjusted to some extent by changing the position of the bolts 16 and 19. Aligned apertures 50 are provided in the base in which the bolts 16 and 19 may be engaged if desired.

In raising the front wheel of a vehicle from the surface of the ground the jack A is positioned as illustrated in Figure 1 of the drawings with the bracket 40 in the path of forward movement of the front axle or front wheel support. Forward movement of the vehicle moves the axle or wheel support against the bracket 40 swinging the links 21 and 22 upwardly until some of the weight on the axle or wheel support is transmitted through the links to the base. The jack is then in the position shown in Figure 5 of the drawings in dotted outline.

Further movement of the vehicle wheel 51 and its axle 52 toward the left as viewed in Figure 5 of the drawings swings the links 21 and 22 from the position shown in dotted outline in Figure 5 to the position shown in full lines therein. During this time, weight is exerted upon the brace 45, urging the braces 26 and 27 against the base plate 11 of the base 10. The lower ends 49 of the braces 26 and 27 slide along the base plate 11 until the ends thereof engage against the sleeve 17 supported by the bolt 16. Further pivotal movement of the links 21 and 22 is accordingly arrested.

Further movement of the traction wheels of the vehicle will slide the jack along the surface of the ground. However, as the links 21 and 22 pass vertical position there is a noticeable tendency for the vehicle to move forwardly, indicating that the extreme elevated position of the jack is being approached. As a result with but slight practice the driver will recognize when to stop the forward movement of the vehicle. Obviously when extreme position of the links 21 and 22 is reached, there will be a marked increase in the power necessary to move the car forward.

The car may be removed from the jack by reversing the procedure just described. By moving the vehicle rearwardly the axle 52 or wheel support is carried by the links 21 and 22 through vertical position of the links whereupon further rearward movement of the vehicle will tend to collapse the jack. Thus the vehicle engine does the work of raising and lowering the wheel.

When the wheel to be raised is a traction wheel connected by a differential to the engine of the vehicle, the raising of the wheel from the surface of the ground will result in a loss of traction. Thus it is desirable to employ a slightly different method of operation when the traction wheel is to be lifted.

As the rear wheels of the usual present day automobile are the traction wheels of the vehicle, this method will be described accordingly.

Figure 6:
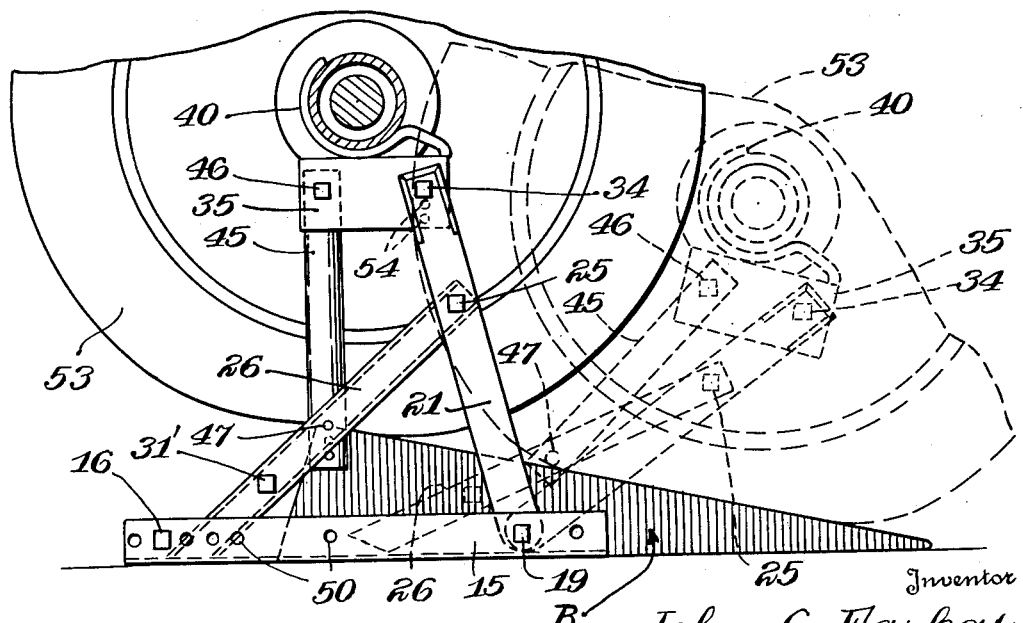
Figure 6 is a view similar to Figure 5 showing the jack in operation lifting a traction wheel of the vehicle.

As illustrated in Figure 6 of the drawings an inclined platform is placed rearwardly of the rear wheel and the jack A is placed in collapsed position with the hook bracket 40 in the path of movement of the rear axle or rear wheel support. Rearward movement of the vehicle tends to roll the rear wheel 53 upwardly on the ramp B. The links 21 and 22 are simultaneously swung upwardly as previously described until these links pass vertical position.

If the ramp or platform B is properly arranged the rear wheel 53 will ride off the end of the platform B just after the links 21 and 22 pass vertical position. The weight of the vehicle will then move the links into their extreme position illustrated in full lines in Figure 6 of the drawings. However, should the ramp B be placed slightly to the rear of its preferred position, the rotary movement of the rear wheels will act either to slide the jack A along the surface of the earth until the elevated wheel is disengaged from the ramp or else the jack will remain in fixed position and the rotation of the wheels will push the ramp forwardly. In either instance the ramp will be disengaged from beneath the rear vehicle wheel when the wheel is elevated.

In order to adjust the height of my jack, I provide apertures 54 in the platform 31 extending through the opposite sides 35 and 36 thereof. The pivot bolt 34 may extend through any of these apertures to hold the platform 31 at the proper elevation. Similarly holes 55 may be provided in the link 45 for engagement with the pivot 47.

A handle 56 may be applied to either end of the base 10 for assistance in properly positioning the jack for operation. The handle 56 is provided with a bifurcated end 57 formed of resilient material. Pegs or pins 59 on the resilient strips 57 are engageable in the opposed apertures 50 in the upright sides 12 and 13 of the base 10, and are held in place by spring tension. The handle may be used to push the jack into proper position for use, and may be detached when not in use by springing the ends 57 together.

In accordance with the patent statutes, I have described the principles of construction and operation of my jack structure, and while I have endeavored to set forth the best embodiments thereof, I desire to have it understood that obvious changes may be made within the scope of the following claims without departing from the spirit of my invention.

I claim:

1. A jack comprising a base, link means pivotally connected to said base and movable from a forwardly inclined position through vertical position to the extreme position oppositely inclined to said first inclined position, means on the free end of said link means engageable with the portion of the vehicle to be raised, and brace means pivotally connected to said link means and slidable along said base to an extreme position with respect thereto.

2. A vehicle jack comprising a base, link means pivotally connected thereto along a substantially horizontal pivot, brace means pivotally connected at one end to said link means along a substantially horizontal pivot, the other end of said brace means being slidably engageable with said base, stop means on said base for limiting sliding movement of said brace means, and upwardly projecting means on the free end of said link means for engaging the portion of the vehicle to be elevated.

3. A vehicle jack comprising a base, link means pivotally connected thereto along a substantially horizontal pivot, a brace means connected to said link means along a substantially horizontal pivot spaced from said first named pivot, said brace means being slidably engageable with said base, means on said base for limiting the slidable movement of said brace means, a platform pivotally connected to the free end of said link means along a substantially horizontal pivot and an upwardly projecting hook element on said platform.

4. A vehicle jack comprising a base, link means, a substantially horizontal pivot connecting said link means to said base, brace means, a substantially horizontal pivot connecting one end of said brace means to said link means, the other end of said brace means being slidably engageable by said base, means on said base limiting the slidable movement of said brace means with respect thereto, a platform, means pivotally connecting the free end of said link means to said platform, a second brace means, and substantially horizontal pivots connecting one end of said second brace means to said platform and the other end of said second brace means to said first named brace means and means on said platform extending upwardly therefrom for engagement with a vehicle.

5. A vehicle jack comprising a base, a pair of links pivotally connected to said base to swing in unison, a substantially horizontal pivot means connecting one end of each of said links to said base, a brace means pivotally connected to said links at a point spaced from said first named pivot means, substantially horizontal pivot means connecting said brace means to said links, one end of said brace means being slidably engageable with said base, means associated with said base for limiting slidable movement of said brace means on said base, a platform, substantially horizontal pivot means connecting said platform to the upper extremity of said links, a second brace means, and substantially horizontal pivot means connecting one end of said second brace means to said platform, and the other end of said second brace means to said first brace means and means on said platform extending upwardly therefrom for engagement with a vehicle.

6. A vehicle jack in combination with an inclined ramp, said ramp supporting a vehicle wheel to be elevated, the jack including a base, a pair of opposed links pivotally connected thereto along a substantially horizontal pivot, said links being swingable from an inclined position relative to the base through vertical position and into an oppositely inclined position, means for limiting pivotal movement of said links in said oppositely inclined position, and means supported along aligned pivots by the free ends of said links engageable with the portion of the vehicle to be elevated in either inclined position.

7. A vehicle jack comprising a channel shaped base having a bottom panel and parallel side wall panels, link means pivotally connected between said side wall panels, a bracket supported by the free end of said link means, said link means being pivotal from a forwardly inclined position through vertical position to oppositely inclined position, brace means on said link means slidably engageable with said bottom panel between said side panels, and means for limiting slidable movement of said brace means.

8. The construction described in claim 7 in which the limiting means comprises a member extending between said side wall panels of said base.

9. The construction described in claim 7 in which the limiting means comprises a member adjustably supported by said side wall panels above said bottom panel.

JOHN G. FARKAS.

REFERENCES CITED

The following references are of record in the file of this patent:

UNITED STATES PATENTS

| Number | Name | Date |
|---|---|---|
| 1,680,228 | Marty | Aug. 7, 1928 |
| 1,687,503 | McKee | Oct. 16, 1928 |
| 1,706,919 | Ericson et al. | Mar. 26, 1929 |
| 2,166,477 | Polk et al. | July 18, 1939 |

FOREIGN PATENTS

| Number | Country | Date |
|---|---|---|
| 183,731 | Canada | Apr. 23, 1918 |